United States Patent [19]

Scholten et al.

[11] Patent Number: 5,098,966
[45] Date of Patent: Mar. 24, 1992

[54] MODIFIED EPOXY RESINS PRODUCED FROM GLYCIDYL ESTERS AND A TIN-CONTAINING ETERIFICATION CATALYST

[75] Inventors: Henricus P. H. Scholten; Olivier L. P. Andre, both of Ottignies-Louvain-la-Neuve, Belgium

[73] Assignee: Shell Oil Company, Houston, Tex.

[21] Appl. No.: 498,054

[22] Filed: Mar. 23, 1990

[30] Foreign Application Priority Data

Apr. 3, 1989 [GB] United Kingdom ............... 8907487

[51] Int. Cl.$^5$ ............... C08G 59/14; C08F 283/00
[52] U.S. Cl. ............... 525/533; 523/403; 523/404; 525/481; 525/488
[58] Field of Search ............... 525/533, 481, 488; 523/403, 404

[56] References Cited

U.S. PATENT DOCUMENTS

| | | | |
|---|---|---|---|
| 4,246,089 | 1/1981 | Hazan | 204/181 |
| 4,755,583 | 7/1988 | Scholten | 528/110 |
| 4,865,704 | 9/1989 | Saatweber et al. | 525/533 |
| 4,920,182 | 4/1990 | Manser et al. | 525/533 |

Primary Examiner—John Kight, III
Assistant Examiner—T. Mosley

[57] ABSTRACT

An aromatic polyglycidyl polyether resin having an average of 1.5 to 4.5 epoxy groups and 0.1 to 18 primary or secondary —OR groups per molecule, wherein from 5 to 95% of the —OR groups have the general formula —O—CH$_2$—CHOH—CH$_2$—O—C(O)—R', in which R' is a branched C$_{4-17}$ alkyl group, the remainder of the —OR groups being hydroxyl groups, and a process for preparing the same wherein an epoxy compound (A) is reacted with one or more hydroxyl groups contained in a polyglycidyl polyether (B) of a polyhydric aromatic compound in the presence of an etherification catalyst (C), in which (A) is a glycidylester of a C$_{5-18}$ branched aliphatic monocarboxylic acid, (B) is a polyglycidyl polyether having on average of from 1.5 to 4.5 epoxy groups and of form 0.1 to 18 primary or secondary hydroxyl groups per molecule, and (C) is a tin, zinc or iron compound.

13 Claims, No Drawings

MODIFIED EPOXY RESINS PRODUCED FROM GLYCIDYL ESTERS AND A TIN-CONTAINING ETERIFICATION CATALYST

BACKGROUND OF THE INVENTION

This invention relates to aromatic polyglycidyl polyether resins useful in coating and electrodeposition compositions.

The majority of commercially-available aromatic polyglycidyl polyether resins are prepared by reacting a polyhydric phenol such as 2,2-bis(4-hydroxyphenyl)-propane (BPA) with epichlorohydrin. This glycidation reaction, when BPA is the polyhydric phenol, normally proceeds to produce resins having schematic formula I:

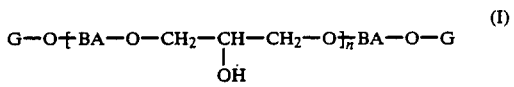

in which G stands for glycidyl and BA stands for the group resulting from the removal of both hydroxyl groups from the polyhydric aromatic compound BPA. The average value of n can be varied within the range of from 0 to 18. For example, in the commercial epoxy resins EPIKOTE® 828, 1001, 3003, 1007 and 1009, typical average values of n are 0.1, 2, 4, and 12, respectively. It follows from the above formula that the number of BA units and secondary hydroxyl groups in the resin molecule equals (n+1) and n, respectively.

The reactivity of the glycidyl group can be exploited to produce modified resins. For example, by etherification with aliphatic diols such as hexanediol or with aliphatic triols such as trimethylolpropane, resins may be obtained of the schematic formulae II, III and IV:

EP-HD-EP     (II)

EP-TMP-EP    (III)

TMP-(EP)$_3$   (IV)

in which HD stands for the hexanediol moiety, TMP for the trimethylolpropane moiety and EP for the resin moiety represented by formula (I) above, in which now one glycidyl group has been converted into a bridging group "—O—CH$_2$—CHOH—CH$_2$—". It will be clear that the etherification reactions yielding products (II) and (III) have resulted in the introduction of two additional secondary hydroxyl groups into the resin molecule, a marked increase of the molecular weight without a substantial change in the number of epoxy groups per molecule, and (by definition) a marked reduction of the epoxy group content (EGC). In product (IV), three additional secondary hydroxyl groups have been introduced. Furthermore, since in the product (III) only two of the three methylol groups of TMP have reacted with a glycidyl group, the third methylol group is left unchanged and it follows that in product (III) also a primary hydroxyl group has been introduced into the resin molecule.

An important application of polyglycidyl polyether resins is in the field of surface coatings such as electrodeposition coatings. In cathodic electrodeposition, improved flow and lower viscosities of resin or binder molecules are very desirable, as better flow allows a smoother surface in film coatings and lower viscosity allows high solids contents in the final binders. The viscosity must be low enough to allow the formulation of a paint; however, an organic solvent provides some of the flow during stoving. A better inherent flow of the binder would therefore permit a lower solvent content. Low viscosity combined with improved flow could eventually lead to solventless binders and related paints.

Flow in cathodic electrodeposition binders may be provided by incorporation of long aliphatic chains, e.g., fatty acids or aliphatic monoamines. Both routes lead to a strongly reduced number of glycidyl groups per molecule, however, which, as the molecular weight is increased, is accompanied by an even more marked reduction of the EGC.

It is therefore an object of the invention to provide low-viscosity resins without substantially reducing the number of glycidyl groups per molecule. In one embodiment, the invention seeks to solve the problem of introducing glycidylester moieties of $C_{5-18}$ branched aliphatic acids by selective reaction with primary or secondary hydroxyl groups in polyglycidyl polyether molecules.

BRIEF SUMMARY OF THE INVENTION

According to the invention, a process is provided for preparing a polyglycidyl polyether resin, wherein an epoxy compound (A) is reacted with one or more hydroxyl groups contained in a polyglycidyl polyether (B) of a polyhydric aromatic compound in the presence of an etherification catalyst (C), in which (A) is a glycidylester of a $C_{5-18}$ branched aliphatic monocarboxylic acid, (B) is a polyglycidyl polyether having, on average, from 1.5 to 4.5 epoxy groups and from 0.1 to 18 primary or secondary hydroxyl groups per molecule, and (C) is a tin, zinc or iron compound.

Also according to the invention, novel aromatic polyglycidyl polyether resins are provided, the resins having on average from 1.5 to 4.5 epoxy groups and from 0.1 to 18 primary or secondary —OR groups per molecule, wherein from 5 to 95% of the —OR groups have the general formula —O—CH$_2$—CHOH—CH$_2$—O—C(O)—R', in which R' is a branched $C_{4-17}$ alkyl group, the remainder of the —OR groups being hydroxyl groups.

DETAILED DESCRIPTION OF THE INVENTION

Preferred novel resins produced according to the invention are resins wherein at most 75% of the —OR groups are hydroxyl groups. Preferably the novel resin is a diglycidylether which can be represented by the schematic formula V:

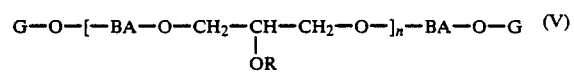

in which G represents glycidyl and BA stands for the group resulting from the removal of both hydroxyl groups from a dihydric aromatic compound. The improvement in flow and viscosity is most striking in resins having an EGC of at most 2.5 meq/g, i.e., resins that would normally have been very viscous or solid, and these novel resins are consequently particularly preferred. Most preferred novel resins are resins schematically represented by formula V wherein n has an average value of from 1.5 to 4.5.

Alternatively, suitable novel resins are polyglycidyl polyethers having the schematic formulae II, III, or IV:

EP-HD-EP (II)

EP-TMP-EP (III)

TMP-(EP)$_3$ (IV)

in which HD represents an aliphatic dihydric moiety such as a hexanediol moiety, TMP an aliphatic trihydric moiety such as a trimethylolpropane moiety and EP the resin moiety marked in formula V, in which a glycidyl group has been converted into a bridging group —O—CH$_2$—CHOH—CH$_2$—. The aliphatic di- or trihydric moieties are preferably derived from aliphatic di- or triols having 3 to 18 carbon atoms per molecule. Most preferred novel resins stem from a branched di- or triol, the latter being most preferred. Examples of preferred diols include 1,2-ethanediol, 1,3-propanediol, 1,5-pentanediol, 1,6-hexanediol, 4-propyl-1,7-heptanediol, and 3,9-dimethylolundecane. Examples of preferred triols include 1,1,1-trimethylolpropane, 1,1,1-trimethylolnonane and 3,4-dimethylol-1-heptanol. Suitable di- or triols are also the ethylene oxide modified derivatives of the compounds above, with the proviso that the number of carbon atoms per molecule does not exceed 18.

The most preferred class of resins are any of the above-described resins in which the parent polyhydric aromatic compound is a bis(hydroxyphenyl)propane such as 2,2-bis(4-hydroxyphenyl)propane.

The glycidylester of the monocarboxylic acid R'-COOH may suitably be any or a mixture of the glycidylesters of $C_{5-18}$ branched aliphatic acids. R' may be olefinically unsaturated and/or substituted by inert substituents, however such is not preferred. Preferably R' represents the alkyl groups present in a mixture of glycidylesters of $C_{9-11}$ branched aliphatic acids commercially known as CARDURA E10.

Suitable etherification catalysts include halides and salts of alkanoic and naphtenic acids, particularly of those having from 2 to 30 carbon atoms per molecule. Very suitable catalysts are tin, zinc or iron chlorides, tin or zinc alkanoates, dibutyltin dialkanoates, and iron salts of naphtenic acids. Preferred catalysts are tin dioctoate, tin dichloride, dibutyltin dilaurate and tin tetrachloride, with tin dioctoate being most preferred.

Preferably the relative amount of starting material is such that the final resin contains essentially no free glycidylester. Hence, the preferred relative amount, as expressed by the equivalent ratio of glycidylester to hydroxyl group, is less than or equal to 1:1.

The catalyst may be employed at relatively low amounts and low reaction temperatures. Thus, addition of 0.01 to 0.4% m/m of catalyst while heating the reaction mixture to a temperature in the range of from 100° to 200° C. is adequate. Particularly suitable amounts of catalyst range from 0.03 to 1.0% m/m, preferably from 0.05 to 0.25% m/m. The reaction may very suitably be carried out at a temperature in the range of from 115° to 225° C., preferably from 130° to 175° C.

If desired, the process according to the invention may be carried out in the presence of a suitable non-reactive solvent, for example hydrocarbons such as octane, nonane, decane, toluene, the three xylenes, ethylbenzene or isopropylbenzene; ethers such as 1,4-dioxane, diethylether of ethylene glycol, diethylether of diethylene glycol; and chlorinated hydrocarbons such as monochlorobenzene. Alcohols, aldehydes, ketones and the like are considered less suitable since they may form undesired by-products.

It was found that, by proper choice of the etherification catalyst, reaction was possible between the epoxy group of the glycidylester with one or more primary or secondary hydroxyl groups contained in the polyglycidyl polyether, without causing the unwanted side-reactions of the epoxy group of the polyglycidyl polyether with any of the hydroxyl groups present and of the epoxy group in reactant A with those in reactant B. As a result, resins were obtained showing a decrease in EGC and an increase in average molecular weight, in line with no more than the introduction of the glycidylester moiety per reacted primary or secondary hydroxyl group. The inherent flow capacity of the polyglycidyl polyethers is substantially enhanced. Moreover, when allowing for excess of primary or secondary hydroxyl groups relative to the glycidylester moiety and for substantially complete conversion of the latter, free glycidylester and products of side-reactions were not detected (gel permeation chromatography), clearly indicating the selective performance of the etherification catalyst. Lastly, the products had a viscosity (in Pa.s) lower than that of unmodified polyglycidyl polyethers of equal EGC, which favorably improves the applicability of these novel resins.

The favorable properties of the resins according to the invention make them suitable for applications in powder coatings, ambient cure paints, stoving enamels, and anionic or cathodic electrodeposition coatings. For the latter coatings the novel resins of the present invention are first modified with an acid or a base (such as an amine), neutralized, and then applied together with a suitable crosslinking agent.

Attractive crosslinking resins for curable coating systems are, for example, those disclosed in European patent applications 244,897 and 281,213. Particularly suitable crosslinking agents are the ambient curing amines, reactive isocyanates and thiols, as well as the high temperature curing aminoplast-type resins, such as alkoxylated reaction products of formaldehyde with melamine or benzoguanamide. Other suitable crosslinking agents include urea-aldehyde resins, phenol-aldehyde resins, bisphenolic or anhydride curing agents, polycarboxylic compounds, dicyandiamide and blocked polyisocyanates. Suitable catalysts which may be employed in the curable coating compositions are acids such as orthophosphoric acid or p-toluene-sulphonic acid. These catalysts may be used in an amount in the range of from, for example, 0.05 to 2% by weight, calculated on polyether and cross-linking resin.

The relative proportions of polyether resin and curing agent are those generally employed in the curable binders, typically of from 5 to 50% by weight, calculated on the total of polyether resin and cross-linking resin.

The curable coating composition can be applied by a variety of methods as known in the art, for example, spraying, dipping or roller coating. Other applications such as in laminates or castings are also possible. The resins may be blended with conventional solvents such as aliphatic or aromatic hydrocarbons, however the low viscosity of the resins and the improved flow capacity permits the solvent content to be very low. Thus a reduction of at least 23% w/w of solvent in the curable coating compositions can be achieved with coating and deposition characteristics similar to or better than the standard coating compositions. Even solvent free formulations are envisaged by use of the novel resins of the present invention. Pigments, fillers, dispersing agents and other additives of coating formulations may be added to the curable binder system comprising the polyethers made in accordance with the process of this invention. The invention will be further understood from the following examples.

EXAMPLE 1

EPIKOTE® 828 ("E828") and TMP were charged at an epoxy group/primary hydroxyl group ratio of 4/3 (eq./eq.) to a suitable glass reactor equipped with anchor stirrer, reflux condenser and thermocouple. The ingredients were heated to 100° C. and catalyst tin dioctoate (0.25% m/m) was added. The etherification was carried out at 170° C. in the absence of a solvent. The course of reaction was followed by taking samples at regular intervals and determining the EGC value of the sampled material. When the theoretical EGC value was reached, the reaction was stopped by rapid cooling. The resin so obtained is designated EP-TMP-EP in Table 1 below.

The experiments were carried out in a 1 liter glass reactor equipped with a stainless steel stirrer, nitrogen inlet, heating mantle, a thermocouple and a reflux condenser. The resins marked in the first column of Table 1 were charged into the reactor and heated to a temperature of 145°-160° C. The catalyst was added to a glycidylester (CARDURA® E10; hereinafter "CE10") and this solution was introduced into the reactor. The reactor was heated to the desired reaction temperature. The reaction was stopped by cooling. Experimental data are summarized in Table 1.

Modified EPIKOTE® 1001 was evaluated and compared with unmodified EPIKOTE® 1001. Lacquer formulations were made comprising, in a stochiometric ratio of one epoxy group per active amino hydrogen atom, the epoxy resin in a 75% m/m solids solution in xylene, and an amine curing agent. The amine curing agent was a 55% m/m solids solution of an E1001/diamine adduct (1 epoxy equivalent per mole amine) in 1:1 MethylPROXITOL®/xylene. The clear lacquer was applied onto a bare steel panel in a dry film thickness of approximately 35 μm. The panel was cured at ambient temperature (23° C.) for 7 days, after which relevant lacquer properties were assessed (Table 2). It was observed that the film formation of the modified resin was better than that of the unmodified resin.

EXAMPLE 2

Cathodic Electrodeposition Evaluation

In a 3-liter reactor equipped with stirrer, reflux condenser and thermocouple, a binder was prepared. To the reactor were added 237.5 g (0.5 eq) of E1001, 591.4 g (1.0 eq) of E1001-CE10 and 296.4 g of ButylOXITOL® and heated to 120° C. until a homogeneous solution was formed. After cooling to 60° C. 52.6 g (0.504 eq) of diethanol amine (DEOLA) was added. The solution was then stirred at 60°±2° C. (exotherm, cooling required) until the combined epoxy and amine content was 1.49 meq/g solution, indicating complete addition of the amine to the epoxy groups. This required between 30 and 60 minutes at 60° C. Immediately thereafter, a mixture of 25.5 g (0.504 eq) of 3-dimethylaminopropylamine (DMAP), 15.3 g (0.504 eq) of ethanolamine (EOLA), and 98.8 g of ButylOXITOL® were added. The temperature was brought to 80° C. and the mass was allowed to react at a temperature between 80° C. and 90° C. for one hour. Finally, the mass was heated to 120° C. for another hour. The clear resin solution had a solids content of 70.0% and a combined epoxy and amine content of 1.34 meq/g solution.

The above procedure was repeated for comparison using 708.9 g (1.5 eq) of E1001, 53.7 g (0.510 eq) of DEOLA, 26.1 g (0.510 eq) of DMAP, 15.6 g (0.510 eq) of EOLA, and 258.5 g plus 86.2 g of ButylOXITOL.

A polyester crosslinker was prepared by charging 768 g (4 mole) trimellitic anhydride and 2000 g (8 mole) CE10 to a 5-liter reactor equipped with stirrer, thermocouple, reflux condenser and cooling facilities (air blowing was sufficient). The mass was slowly heated to 90°-100° C., when an exothermic reaction started. The heating source was removed and the temperature was allowed to rise to 190°-195° C. exothermically (air cooling applied). The mass was kept at 190°-195° C. for about 15 minutes, the clear product was allowed to cool to 140° C., and 2.73 g (3 ml) N,N-dimethylbenzylamine was added. The mass was stirred at 140°-145° C. until the acid value was less than 3 mg KOH/g. If the acid value was still too high after a reaction time of one hour, and if the epoxy content was then already below 0.05 meq/g, an extra amount of CE10 equivalent to the remaining acid content was added. The reaction was then continued until the acid value was below 3 mg KOH/g. The product was then thinned with ButylOXITOL® and cooled to room temperature at once. The solids content was 70%.

Paint formulations were prepared by blending 163.7 g of either binder (A) or (B) with 60.9 g of the polyester crosslinker, and 3.1 g lead siccatol (33% Pb) at room temperature. 8.2 g of lactic acid (90% in H$_2$O) was added to the mixture and mixed homogeneously. The hazy-milky mixtures were diluted with 392.9 g demineralized water until milky solutions with a solids content of approximately 25% were obtained. To prevent phase separation, these solutions were stirred during storage.

The paint formulations were applied to a panel using different application voltages and curing the paint formulations for 30 minutes at 160° C. The CE10-modified paint formulation showed improved flow and the film had a lower roughness. Film characteristics are summarized in Table 3.

EXAMPLE 3

Cathodic Electrodeposition Evaluation

A hexanediamine-CARDURA E10 adduct ("HD-2CE10") was prepared in a one-liter reactor equipped with stirrer, thermocouple, dropping funnel and nitrogen blanketing. 116 g (1 mole) of 1,6-hexanediamine was melted and heated to 100°-110° C., and 500 g (2 eq) of CE10 was gradually added (30-60 minutes) while the temperature was maintained. After addition was completed, heating was continued at 110° C. until the combined epoxy and amine content was below 3.30 meq/g. This took about one hour.

A binder (i) was prepared in accordance with the procedure as described in Example 2 using 310.5 g (0.504 eq) of HD-2CE10 instead of EOLA, and using an amount of ButylOXITOL® in % w/w as indicated in Table 4. In addition, a binder (ii) was prepared using the above procedure and 887.1 g (1.5 eq) of E1001-CE10, instead of 237.5 g (0.5 eq) of E1001 and 591.4 g (1.0 eq) of E1001-CE10. Paint formulations were prepared and applied analogous to the procedure set out in Example 2. Film characteristics using these paint formulations are summarized in Table 4 below.

TABLE 4

| Binder | Layer thickness in μm | application voltage | ButylOXITOL % w/w | Film appearance smoothness |
|---|---|---|---|---|
| (i) | 20 | 138 | 6.4 | very good |
| (ii) | 20 | 81 | 6.4 | very good |
| (iii) | 20 | 108 | 4.9 | very good |

TABLE 1

| Epoxy | mol ratio CE10/E | E g | CE10 g | Sn(2) g | temp °C. | time of reaction | EGC meq/g | visc. Pa.s* |
|---|---|---|---|---|---|---|---|---|
| EP-TMP-EP | | | | | | | 2.15 | 0.230 |
| | 0.75/1 | 306 | 61 | 0.75 | 145 | 7.0 | 1.94 | 0.170 |
| E834 | | | | | | | 4.04 | 0.043 |
| n = 0.58 | 0.38/1 | 1000 | 190 | 2.82 | 170 | 2.0 | 3.36 | 0.047 |
| E1001 | | | | | | | 2.13 | 0.230 |
| n = 2.15 | 1.00/1 | 1132 | 301 | 2.36 | 170 | 3.0 | 1.69 | 0.163 |
| | 1.50/1 | 250 | 106 | 0.70 | 160 | 5.3 | 1.51 | 0.148 |
| E3003 | | | | | | | 1.29 | 1.200 |
| n = 4.31 | 0.50/1 | 1500 | 122 | 2.60 | 170 | 1.5 | 1.21 | 1.120 |
| | 1.00/1 | 400 | 65 | 0.70 | 170 | 3.0 | 1.12 | 0.820 |

*Viscosity analyzed in 50% m/m ButylOXITOL ® solutions.

TABLE 2

| Characteristics | CE10-modified Epoxy | Unmodified Epoxy |
|---|---|---|
| Solution viscosity, (Pa.s) | 4.9 | 13.2 |
| Film appearance | slight ciss | excellent |
| MEK resistance (50 double rubs) | slightly soft | very slightly soft |
| Adhesion | | |
| cross hatch (ASTM D2197-86) | pass | pass |
| Gitterschnitt (DIN 53 151) | Gt 0 | Gt 0 |
| Impact strength (cm · kg) | | |
| direct | 92 | >92 |
| reversed | 81–86 | 92 |

TABLE 3

| Layer thickness in μm | CE10-modified Epoxy | Unmodified Epoxy |
|---|---|---|
| 18 | good | very poor |
| 22 | fair | very poor |
| 28 | fair–poor | very poor |

We claim:

1. A process comprising contacting, in a reaction mixture at a temperature within the range of about 130° to about 175° C.,
   (a) a polyglycidyl ether of a polyhydric aromatic compound, said polyglycidyl ether having an average of 1.5 to 4.5 epoxy groups per molecule and 0.1 to 1 primary and/or secondary hydroxyl groups per molecule,
   (b) a glycidyl ester of a $C_{5-8}$ branched aliphatic monocarboxylic acid, and
   (c) a tin-containing etherification catalyst, for a time effective for essentially complete consumption of the glycidyl ester groups of said glycidyl ester to produce a modified polyglycidyl ether having a relatively low, with respect to said polyglycidyl ether, viscosity.

2. An aromatic polyglycidyl polyether composition which can be represented by the schematic formula:

$$G-O-[-BA-O-CH_2-CH(OR)-CH_2-O-]_n-BA-O-G \quad (V)$$

in which G represents glycidyl and BA represents a residual of a dihydric aromatic compound, said polyether composition having an average of 1.5 to 4.5 epoxy groups and 0.1 to 18 primary or secondary —OR groups per molecule, wherein from 25 to 95% of the —OR groups have the general formula —O—CH$_2$—CHOH—CH$_2$—O—C(O)—R', in which R' is a branched $C_{7-14}$ alkyl group, the remainder of the —OR groups being hydroxyl groups.

3. The composition of claim 2 in which the aromatic polyglycidylether resin has an epoxy group content of at most 2.5 meq/g.

4. The composition of claim 3 in which n has an average value of from 1.5 to 4.5.

5. The composition of claim 4 in which the resin is a polyglycidyl polyether having the schematic formula II, III, or IV:

| | |
|---|---|
| EP-HD-EP | (II) |
| EP-TMP-EP | (III) |
| TMP-(EP)$_3$ | (IV) | in which HD represents an aliphatic dihydric moiety, TMP an aliphatic trihydric moiety and EP for the resin moiety represented by formula V in which a glycidyl group has been converted into a bridging group —O—CH$_2$—CHOH—CH$_2$—.

6. The composition of claim 5 in which HD stands for a hexanediol moiety and TMP stands for a trimethylolpropane moiety.

7. The composition of claim 6 in which BA represents a residual moiety from a bis(hydroxyphenyl)propane.

8. The composition of claim 7 in which R' is a branched $C_{9-11}$ alkyl radical.

9. The process of claim 1 in which the etherification catalyst is selected from halide salts and salts of alkanoic and naphthenic acids.

10. The process of claim 1 in which the etherification catalyst is selected from chloride salts, tin and zinc alkanoates, dibutyltin(IV)alkanoates, and iron naphtenates.

11. The process of claim 10 in which the etherification catalyst is tin(II)octoate.

12. The process of claim 11 in which the glycidylester is a glycidylester of a mixture of $C_{9-11}$ branched aliphatic monocarboxylic acids.

13. A curable coating composition comprising the polyether resin of claim 1 and a crosslinking resin.

* * * * *